Patented Nov. 20, 1945

2,389,445

UNITED STATES PATENT OFFICE 2,389,445

PRODUCTION OF ETHYL BENZENE

William J. Mattox and Wayne L. Benedict, Chicago, Ill., assignors to Universal Oil Products Company, Chicago, Ill., a corporation of Delaware No Drawing. Application February 11, 1942, Serial No. 430,505

5 Claims. (Cl. 260—671)

This invention relates to a process for converting poly-alkyl aromatic hydrocarbons to alkyl aromatic hydrocarbons of lower molecular weight. More specifically it relates to a method for reacting a mixture of benzene and poly ethyl aromatic hydrocarbons to produce alkyl aromatic hydrocarbons containing a smaller number of ethyl groups, particularly mono-ethyl benzene.

The result is accomplished by the transfer of ethyl groups from a poly-ethyl aromatic such as di- or tri-ethyl benzene to benzene. Thus for example, one mol of di-ethyl benzene may be reacted with one mol of benzene to form two mols of mono-ethyl benzene.

This type of reaction is known to proceed at relatively low temperatures with aluminum chloride and similar catalysts, but because of the formation of undesirable complexes the process is not commercially attractive. The catalyst consumption is usually large and the yields are comparatively low.

It has also been proposed to treat a mixture of benzene and poly-alkyl aromatics with catalysts of the clay type at temperatures of 800 to 1050° F. in order to effect the de-alkylation of the alkyl aromatics and thereby lower their boiling range. In such a process, however, it must be noted that there is substantially complete recovery of the benzene in each case. The sole function of the benzene seems to be to influence the selectivity of the reaction, and the process appears merely to be an improvement over previously known de-alkylation processes. Both processes, however, involve the production of olefinic hydrocarbons formed by the splitting of side chains.

We have discovered that a totally unexpected result is obtained when polyethylbenzenes are treated in the presence of a substantial excess of benzene with the preferred catalysts and under the preferred conditions of operation hereinafter described. We have found that not only are there substantially no olefins formed as in de-alkylation reactions but that there is a substantially quantitative transfer of ethyl groups to the benzene.

By means of our process it is possible, therefore, to convert the less desirable di- and tri-ethyl benzenes to the highly desirable mono-ethyl benzene. Mono-ethyl benzene is of extreme importance at the present time because it may readily be dehydrogenated to styrene which in turn is an important raw material in the preparation of certain varieties of synthetic rubber. Thus in the direct preparation of mono-ethyl benzene by the alkylation of benzene with ethylene, it is now possible to further react the incidentally produced poly ethyl benzenes, e. g. di- and tri-ethyl benzene, with added benzene under the conditions of the present invention for the production of additional quantities of mono-ethyl benzene.

In one specific embodiment the present invention relates to a process for converting polyethylbenzene and benzene into mono-ethyl benzene by transfer of ethyl groups which comprises contacting a mixture containing at least one mol of benzene per mol of polyethylbenzene with a synthetic catalyst comprising a composite of silica and alumina at a temperature in excess of about 550° C. and at a space velocity of the order of 0.1 to 5 liquid volumes of hydrocarbon per volume of catalyst per hour.

More particularly the catalytic agents which may be employed comprise precipitated silica and one or more precipitated refractory oxides such as alumina, zirconia, thoria, magnesia, etc. and hereinafter known as silica-alumina, silica-zirconia, etc. In addition to these composites the catalyst may be further modified by incorporating therein other refractory oxides such as molybdena, vanadia, chromia, etc. These composites may be prepared by the separate or simultaneous precipitation of the components followed by purification to remove alkali and alkaline earth compounds.

The composite catalysts may be used as powders or as granules or they may be formed into shapes by well known methods and then calcined to produce finished catalysts. As a rule the silica comprises the major component of the catalyst. These composites are not necessarily equivalent in their effectiveness.

The preferred temperature of operation is usually within the range of from about 500 to about 700° C. although in most cases the reaction is most conveniently conducted in the somewhat narrower range of from about 500 to about 600° C. The preferred space velocities are within the range of from about 0.25 to about 1.0. Substantially atmospheric pressures are preferred although superatmospheric pressures may be employed.

In view of the fact that mono-ethyl benzene is the desired product of the reaction, the minimum requirement of benzene will be one mol of benzene for each side chain in excess of one in the polyethylbenzene molecule. In order to approach a substantially quantitative transfer of ethyl groups with low losses, we prefer to conduct the reaction in the presence of a substantial excess of benzene over the minimum quantity specified. A molar excess of benzene of the order of 1 to 3 appears to give satisfactory results. The unconverted benzene may, of course, be separated by fractionation and recycled to the process by well known means.

It will be apparent to those skilled in the art of catalytic hydrocarbon conversions that catalysts of the type described herein will become contaminated with hydrocarbonaceous deposits after a substantial period of use in the hydrocarbon conversion reaction. It will, therefore, be necessary to subject the contaminated catalyst to a regeneration step which usually comprises controlled treatment with an oxygen-containing gas whereby the hydrocarbonaceous deposits are removed by combustion. Hydrogen or hydrogen-containing gases may conveniently be added to the reaction zone in order to keep the amount of catalyst deposit at a minimum. A similar result may be obtained by recycling a portion or all of the fixed gases formed in the process. Since the reaction of our process comprises principally the transfer of alkyl groups rather than dealkylation, the fixed gases produced consist largely of hydrogen and methane with little or no olefins being present.

Due to the fact that poly alkyl benzenes such as di- and tri-ethyl benzenes are more readily decomposed than benzene, the latter reactant may be heated in a separate heating coil to a temperature in excess of the reaction temperature and then mixed with the polyethylbenzene which is heated to a lower temperature. The mixture of reactants is then charged to the catalytic reaction zone. By this method it is possible to avoid excessive thermal decomposition.

The term "space velocity" as used herein refers to the liquid volumes of hydrocarbon charge per volume of catalyst per hour.

The following example is given to illustrate the usefulness and operability of the present invention but it is not intended to unduly limit the invention:

A mixture of benzene and di-ethyl benzene is passed over a catalyst comprising about 100 mols of precipitated purified silica composited with 10 mols of alumina. The catalyst is prepared by precipitating hydrated silica and hydrated alumina in successive steps and washing the composite substantially sodium free. The composite is dried, preformed, and calcined at about 800° C. for one hour prior to use. The catalyst pellets are maintained in a so-called "fixed bed" reaction zone and the mixture of hydrocarbon reactants is passed over the catalyst at the desired operating temperature and space velocity.

At atmospheric pressure, a temperature of 600° C., a space velocity of 0.5, and a ratio of one mol of benzene per mol of di-ethyl benzene, a once-through yield of approximately 20 weight percent of mono-ethyl benzene is obtained based on the hydrocarbons charged. At the same time approximately 4 weight percent of fixed gases consisting principally of hydrogen and methane and about 11 weight percent of catalyst deposit are produced. These yields are again based on the hydrocarbons charged.

Under the same conditions of temperature, pressure, and space velocity but with an increase in the benzene concentration of the charging stock to 3 mols of benzene per mol of di-ethyl benzene the following results are obtained on a once-through basis: 16 weight percent of mono-ethyl benzene, 2 weight percent of fixed gases and 6 weight percent of catalyst deposit. The yields are again based on the hydrocarbons charged.

It will readily be seen, therefore, that the presence of a substantial excess of benzene results in a more nearly quantitative transfer of the ethyl groups from the poly ethyl benzene molecules to the benzene molecules. The production of fixed gases and catalyst deposit is decreased markedly, and it is apparent that substantially higher yields of mono-ethyl benzene can be obtained in a recycle operation in the presence of a large excess of benzene than can be obtained with only the minimum quantity of benzene present.

We claim for our invention:

1. A process for producing mono ethyl benzene from poly ethyl benzene which comprises subjecting the poly ethyl benzene in admixture with at least one mol of benzene per ethyl side chain in excess of one in said poly ethyl benzene to the action of a catalyst comprising precipitated silica and a refractory metal oxide at a temperature of from about 500° C. to about 700° C. and at a space velocity of from about 0.1 to about 5.0 to effect transfer of an ethyl group from the poly ethyl benzene to the benzene as the principal reaction of the process.

2. The process of claim 1 further characterized in that the poly ethyl benzene comprises di-ethyl benzene.

3. A process for producing mono ethyl benzene from poly ethyl benzene which comprises subjecting the poly ethyl benzene in admixture with at least one mol of benzene per ethyl side chain in excess of one in said poly ethyl benzene to the action of a catalyst comprising precipitated silica and alumina at a temperature of from about 500° C. to about 700° C. and at a space velocity of from about 0.1 to about 5.0 to effect transfer of an ethyl group from the poly ethyl benzene to the benzene as the principal reaction of the process.

4. A process for producing mono ethyl benzene from poly ethyl benzene which comprises subjecting the poly ethyl benzene in admixture with at least one mol of benzene per ethyl side chain in excess of one in said poly ethyl benzene to the action of a catalyst comprising precipitated silica and zirconia at a temperature of from about 500° C. to about 700° C. and at a space velocity of from about 0.1 to about 5.0 to effect transfer of an ethyl group from the poly ethyl benzene to the benzene as the principal reaction of the process.

5. The process of claim 4 further characterized in that the catalyst contains alumina.

WILLIAM J. MATTOX.
WAYNE L. BENEDICT.